United States Patent [19]
Kubik

[11] Patent Number: 4,753,514
[45] Date of Patent: Jun. 28, 1988

[54] HEADWEAR-MOUNTED PERISCOPIC DISPLAY DEVICE

[75] Inventor: James C. Kubik, Lincoln, Mass.

[73] Assignee: Iota Instrumentation Co., Lincoln, Mass.

[21] Appl. No.: 862,116

[22] Filed: May 12, 1986

[51] Int. Cl.$^4$ .................... G02C 7/14; G02C 9/04; G02B 27/02; G02B 27/32

[52] U.S. Cl. .................... 350/174; 350/287; 350/638; 351/158

[58] Field of Search ............ 350/638, 618, 174, 173, 350/171, 287, 286, 445, 565, 566, 562; 356/251-255; 351/158

[56] References Cited

U.S. PATENT DOCUMENTS

| | | | |
|---|---|---|---|
| D. 195,365 | 6/1963 | Holt | 350/638 |
| 3,216,308 | 11/1965 | Northcutt | 356/251 |
| 3,229,580 | 1/1966 | Mitchell | 350/286 |
| 3,524,710 | 8/1970 | Rickert | 356/251 |
| 4,052,073 | 10/1977 | Miller | 273/148 R |
| 4,550,984 | 11/1985 | Reymond | 350/404 |

FOREIGN PATENT DOCUMENTS

| | | | |
|---|---|---|---|
| 2205325 | 4/1973 | Fed. Rep. of Germany | 356/251 |
| 113913 | 7/1983 | Japan | 351/158 |
| 301672 | 12/1928 | United Kingdom | 350/286 |

OTHER PUBLICATIONS

"Eyeglass Heads-Up Display", H. W. Upton, J. R. Goodman, Bell Helicopter Textron, Fort Worth, TX, presented at the Society for Information Display (SID) International Seminar/Symposium/Exhibition, New York City, New York, 4/28/81, and published in the SID 1981 Digest, pp. 48-49.

"Eyeglass Heads-Up Display", H. W. Upton, J. R. Goodman, Bell Helicopter Textron, Fort Worth, TX, Proceedings of the SID, vol. 23/2, 1982, pp. 77-80.

*Primary Examiner*—Jon W. Henry
*Attorney, Agent, or Firm*—Wolf, Greenfield & Sacks

[57] ABSTRACT

A periscopic display device for close up viewing of a display. The device includes means for generating a display, such as an LED, LCD, or ELD display, and periscopic means consisting of a body of optically clear material having a reflecting prism portion and a collimating lens portion. The prism portion includes a first planar surface positioned parallel and adjacent to the display and a plurality of optically aligned reflecting surfaces for transmitting a reflected image of the display. The collimating lens portion consists of a convex lens having a focal point at the display and is positioned to receive the reflected image for focusing the image at optical infinity. Preferably the body includes a mounting portion in which the display generating means is embedded. The display device is lightweight, waterproof, dustproof, and is easily mounted on the eyeglass frames, visor, or headband of the wearer.

9 Claims, 1 Drawing Sheet

U.S. Patent    Jun. 28, 1988    4,753,514
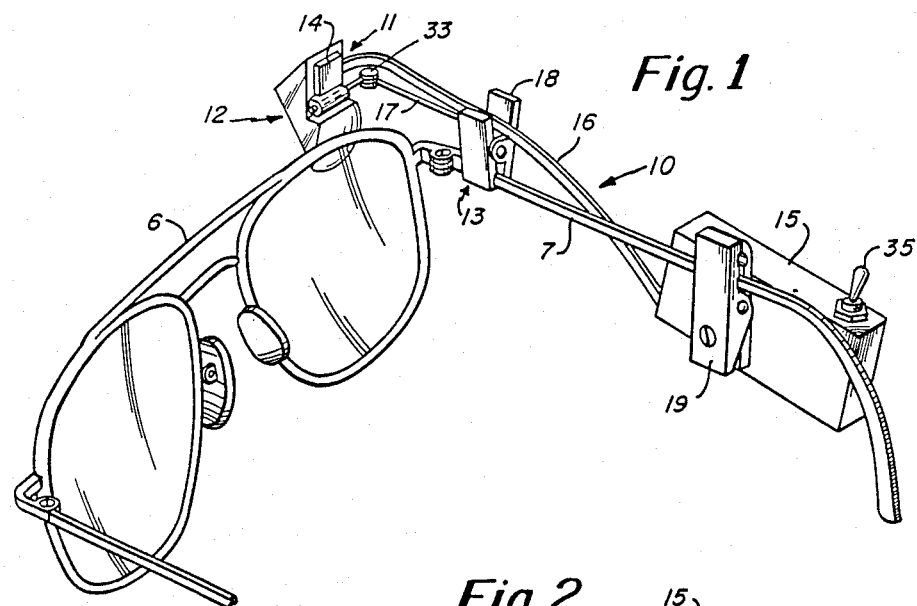
Fig. 1
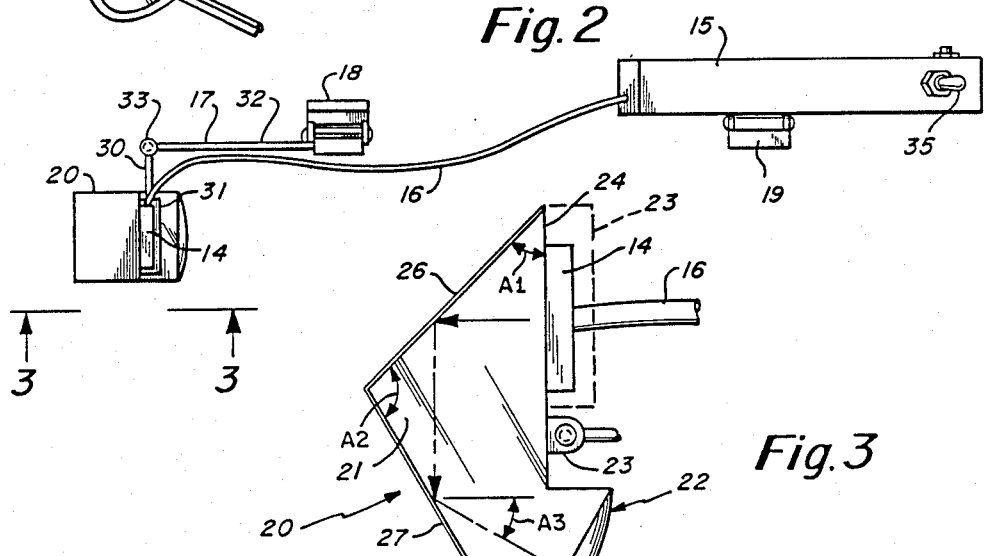
Fig. 2
Fig. 3
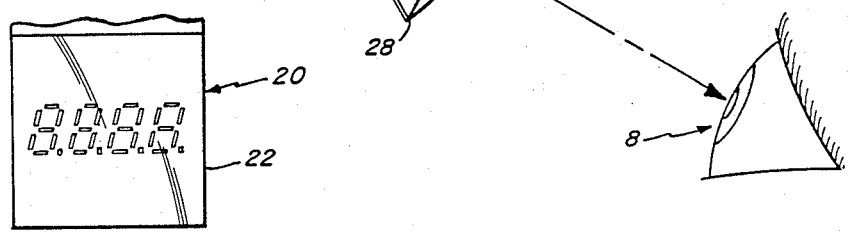
Fig. 4

HEADWEAR-MOUNTED PERISCOPIC DISPLAY DEVICE

FIELD OF THE INVENTION

This invention relates to a headwear-mounted periscopic display device for close up viewing of a real-image display.

BACKGROUND OF THE INVENTION

Display devices for viewing a virtual image of a display are described in U.S. Pat. No. 3,170,979 to Baldwin et al. and U.S. Pat. No. 3,059,519 to Stanton. These devices are complex and expensive and are intended for use by pilots and other professionals who need to have certain information continuously displayed within their line-of-sight.

The Baldwin et al. device superimposes an image from a cathode ray tube onto a half-silvered, see-through mirror positioned in the viewing field of the user so as to superimpose an image of the tube display on the normal background environment of the viewer. An elongated tube contains the cathode ray tube and a plurality of separate lenses which project the image onto a half-silvered surface and focus the image at optical infinity. The device is mounted on a harness worn over a helmet and measures about $1\frac{1}{4} \times 5$ inches and weighs less than six ounces.

The Stanton device includes a cathode ray tube and a plurality of lenses and mirrors. The Stanton device is mounted on the inside of a helmet and the image is displayed on a full reflecting mirror positioned at the lower edge of the helmet just above the pilot's eyes.

The Baldwin et al. and Stanton devices are complex optical systems including a plurality of separate lenses and mirrors which must be accurately positioned within the composite assembly. Each device is sufficiently large that it must be mounted on a helmet to provide sufficient stabilization and support. The price of these complex units can be justified when purchased for use by a pilot or other professional, but they are not intended for sale as a consumer item.

It has been suggested to provide a lap counter on a pair of swimming goggles in U.S. Pat. No. 4,530,105 to Rabinowitz. The counter includes a flux change detector which detects a change in direction of the earth's magnetic field when the swimmer changes direction, means for producing a pulse output during each such change in direction, circuit means for counting the pulses, and display mean for displaying the number of laps completed, such as an LED or LCD display. An LED display is shown mounted on one lens of the goggles with battery-operated circuitry for the display mounted on the headband of the goggles. Rabinowitz does not disclose an operative device because no means are described for focusing the display or rendering it waterproof. An LED display device mounted on a pair of swimming goggles is too close to the viewer's eyes to be readable.

It is an object of this invention to provide a periscopic display device for close up viewing of a virtual-image display.

Other objects are to provide a periscopic display device which is lightweight, inexpensive to produce, waterproof, dustproof, impact-resistant, and adapted to be mounted on the headwear of the viewer.

SUMMARY OF THE INVENTION

A periscopic display device is provided for close up viewing consisting of a display generating means and a unitary periscopic viewing means. The display generating means may be any type of electronic display device, such as light-emitting diode (LED), electroluminescent (ELD), or liquid crystal (LCD). The periscopic viewing means consists of a body of optically clear material having a reflecting prism portion and a collimating lens portion. The prism portion includes a first planar surface positioned parallel and adjacent to the display and a plurality of optically aligned reflecting surfaces for transmitting a reflected image of the display. The collimating lens portion includes a convex lens having a focal point at the display which is positioned to receive the reflected image and focus the image at optical infinity. In addition, means are provided for mounting the periscopic viewing means on headwear, such as eyeglass frames, a headband, the sunvisor of a cap, or other hat.

In a preferred embodiment, the display generating means is mounted on the first planar surface. More preferably, the optically clear body includes a mounting portion in which the display generating means is embedded. The prism portion includes a pair of reflecting surfaces, a first reflecting surface disposed at an angle of about 45° with respect to the first planar surface, and a second reflecting surface disposed at an angle of from about 103° to about 107°, and more preferably about 105°, with respect to the first reflecting surface. The focal length of the collimating lens is about 0.9 to about 1.1 inches. More preferably, the viewing means is made of clear epoxy resin having a refractive index of about 1.5 and the focal length of the collimating lens is about 1 inch. This device permits a $0.04 \times 0.250$ inch display of 4 LED characters to be readily viewed when mounted on the eyeglasses of the wearer.

Additional features of the invention, its nature and various advantages, will be better understood from the following description of a preferred embodiment.

BRIEF DESCRIPTION OF THE DRAWINGS

FIG. 1 is a perspective view of the periscopic display device of this invention mounted on a pair of eyeglass frames.

FIG. 2 is a top elevational view of the periscopic display device of FIG. 1.

FIG. 3 is a schematic diagram of the periscopic viewing means positioned with respect to the viewer's eyeball.

FIG. 4 is a schematic diagram of a four character LED display viewed from the collimating lens portion.

DETAILED DESCRIPTION OF A PREFERRED EMBODIMENT

A preferred embodiment of the periscopic display device 10 of this invention is shown in the drawings. The device, shown in FIG. 1 mounted on a pair of eyeglass frames 6, includes a display generating means 11, a periscopic viewing means 12, and mounting means 13. The periscopic viewing means 12 is mounted in front of the upper right corner of the right eyeglass lens within the viewer's line of sight. The display generating means 11 includes a display screen 14 mounted on the periscopic viewing means, a light-weight metal or plastic housing 15 containing electronic circuit means for generating the display, and connecting means 16 for operatively connecting the electronic circuit to the display screen. The mounting means 13 includes an arm 17 connected at one end to the periscopic viewing means and at the other end to a clip 18 attached to a side arm 7 of the eyeglass frames. A second clip 19 connects the housing 15 to side 7 of the eyeglass frames.

By way of example, the display may comprise four LED characters, as shown in FIG. 4, which are programmed to function as a count-down timer. The two left hand characters can be programmed to display the minutes and the two right hand characters, the seconds. Such a timer would be useful to a sailboat racer for keeping track of the time remaining until the start of the race. By setting the counter at 5:00 when the five-minute warning is given, the sailboat operator has within his field of view while he moves about the boat a continuous display of the time remaining until the start of the race. Because the device is waterproof, it is particularly desirable for this use.

The display generating means 11 described in this embodiment is a light-emitting diode (LED) display. However, other means for displaying visual information can be used, such as a liquid crystal display (LCD), or an electroluminescent display (ELD).

The display screen 14 shown in the drawings consists of four seven-segment LED characters or chips mounted in a chip carrier. Each character has a height of 0.040 inch and is disposed in a die which is 0.048×0.036 inch. The four chips are mounted in an eighteen lead memory chip carrier which is 0.35×0.29 inches. Connecting means 16 is a flexible ribbon cable or other conducting means which connects the leads from the chip carrier to the circuit means for operating the LED display.

The unitary periscopic viewing means 12 consists of a body 20 of optically clear material, such as clear epoxy resin or glass, having a refractive index of from about 1.45 to about 1.55, and preferably consists of a clear epoxy resin having a refractive index of about 1.5. A suitable resin is sold under the tradename ER 2400 (clear), by Formulated Resins, Inc., of Greenville, R.I. The optically clear body includes a reflecting prism portion 21, a collimating lens portion 22 and preferably a mounting portion 23 (shown in phantom in FIG. 3) in which the LED display is embedded.

The prism portion 21 includes a first planar surface 24 positioned parallel and adjacent to the display screen 14. In the preferred embodiment, the LED carrier with attached leads is embedded in a mounting portion 23 of the optically clear body 20. The prism portion further includes a plurality of optically aligned reflecting surfaces 26, 27 for transmitting a reflected image of the display. In the preferred embodiment, a first reflecting surface 26 is disposed at an angle A1 of about 45° with respect to the first planar surface 24, and a second reflecting surface 27 is positioned at an angle A2 of from about 103° to about 107° with respect to the first reflecting surface, and more preferably about 105°. The reflecting surfaces 26, 27 are preferably mirrored, such as by applying a vacuum-deposited metallic coating thereon, to reduce light loss therethrough. The mirrored surfaces further enhance contrast by permitting less ambient light to enter the body. However, the device will function even if the reflecting surfaces are not mirrored.

The collimating lens portion 22 of the body comprises a spherical convex lens. The focal point of the lens is at the LED display screen 14 and the lens receives the reflected image from the second reflecting surface 27 and focuses the image at optical infinity. The collimating lens magnifies the LED display to enable the viewer to read the display without difficulty.

In the preferred embodiment shown, the body 20 is 0.5 inches wide×0.9 inches high, the first planar surface 24 is 0.5 wide×0.4 inches high, the first reflecting surface 26 is 0.5 inches in length, the second reflecting surface 27 is 0.7 inches in length, the first reflecting angle A1 is 45°, and the second reflecting angle A2 is 105°. With the body vertically aligned so that the first planar surface 24 lies in a vertical plane, as shown in FIG. 3, the light rays exit from the collimating lens 22 at an angle A3 of 30° below horizontal. If the bottom edge 28 of the collimating lens is positioned about 0.75 inches above the top of the eyeball 8, the display is easily read by the viewer while looking slightly above the line of sight of his normal gaze.

Mounting means are provided for mounting the composite periscopic viewing means 12 and display screen 14 on the user's headwear. Because the display viewing means and screen are very light, weighing no more than about two ounces, it can be readily mounted on a pair of eyeglass frames. The mounting means includes a metal arm 17 having a first arm portion 30 disposed horizontally and attached by adhesive 31 to the body 20 between the display screen 14 and collimating lens 22, a second arm portion 32 pivotally connected and extending at right angles to the first arm portion via a pivotal connecting means 33, and a metal clip 18 disposed at the opposite end of second arm portion 17 for releasably attaching the device to arm 7 of the eyeglass frames, visor, headband or the like. Other mounting means may be provided for mounting the body and display screen on eyeglasses, a visor, or any other type of headgear worn by the viewer.

Additional mounting means include a clip 19 for releasably attaching the housing 15 to the eyeglass arm 7. Other means may be used for mounting the housing on the user's eyeglass frames, hat brim, neck pendant, or belt, or the housing may be carried by hand.

The display screen 14 is operatively connected via connecting means 16 to circuit means contained in housing 15. The circuit means preferably includes a microprocessor for programming the display device to function as a count-down timer or a count-up timer, to start counting at zero or a predetermined number. The circuit means may be powered by a battery contained in the housing. A multi-position toggle switch 35 is provided for starting, stopping, and resetting the counter.

By way of example, an ICM7217 microprocessor sold by Intersil, Inc. of Cupertino, Calif. will operate as the count-down timer to drive a four character display of 7 segment LED chips, such as the MMH62 LED chips sold by General Instrument, Optoelectronic Div., Palo Alto, Calif., with the power supplied by a 20 mil. coin/-wafer lithium battery.

One of the principal benefits of the display device of this invention is the minimal power required for viewing the LED display. Because the display can be focused such a short distance from the eye, e.g., within one inch of the eye, the energy required to power the LED display is minimized. Further, the close up viewing enhances the contrast between the LED display and bright backgrounds. Other methods for improving contrast by reducing incoming ambient light are to provide mirrored coatings on the reflecting surfaces and to position the device beneath a visor.

Although the described embodiment of the invention uses an LED display functioning as a count-down timer, many other types of display functions can be provided with the apparatus of this invention. Other functions for the display include use as a clock to show a runner or other athlete the elapsed time, or to measure the heartbeat rate of a patient.

Furthermore, the periscopic device may be used with an LCD or ELD display, rather than an LED display. An LCD display uses much less power than an LED display; however, an LCD display is difficult to see under certain lighting conditions and is generally larger in size. For use with an LCD display, sufficient light must enter the body and reflect off the display to view the same. Perhaps the most preferred display, where cost is not a factor, is an ELD display which exhibits the best combined features of the LED (luminescence) and LCD (low power).

Having described the invention in detail, those skilled in the art will appreciate that numerous modifications may be made thereof without departing from the spirit of the invention. Therefore, it is not intended that the scope of the invention be limited to the specific embodiments described, but rather it is intended that the scope of the invention be determined by the appended claims and their equivalents.

I claim:

1. A periscopic display device for close-up viewing of a display, said device comprising:
   means for generating a display;
   unitary periscopic means for viewing a virtual image of the display, said periscopic means comprising a body of optically clear material having a reflecting prism portion and a collimating lens portion, said prism portion including a first planar surface positioned parallel and adjacent to said display and a pair of optically aligned reflecting surfaces for transmitting a reflected image of said display, said first reflecting surface being disposed at an angle of about 45° with respect to said first planar surface and said second reflecting surface being disposed at an angle of from about 103° to about 107° with respect to said first reflecting surface, said collimating lens portion comprising a convex lens having a focal point at said display and positioned to receive said reflected image for focusing said image at optical infinity;
   said display generating means being mounted on said first planar surface; and
   means for mounting said composite periscopic means and display generating means on headwear for positioning said collimating lens portion within the viewing field of the user.

2. The periscopic display device of claim 1, wherein said body is made of a clear epoxy resin having a refractive index of about 1.5 and said focal length of said collimating lens is about one inch.

3. The periscopic display device of claim 1, wherein said body further includes a mounting portion in which said display generating means is embedded.

4. The periscopic display device of claim 3, wherein said display generating means is an electronic display selected from the group consisting of LED, LCD, and ELD displays.

5. The periscopic display device of claim 1, wherein said second reflecting surface is disposed at an angle of about 105° with respect to said first reflecting surface.

6. The periscopic display device of claim 1, wherein said reflecting surfaces are mirrored.

7. The periscopic display device of claim 1, wherein said collimating lens has a focal length of from about 0.9 to about 1.1 inches.

8. The periscopic display device of claim 7, wherein said collimating lens has a focal length of about one inch.

9. The periscopic display device of claim 8, wherein said body is made of clear epoxy resin having a refractive index of about 1.5.

* * * * *